United States Patent
Martinez

(10) Patent No.: US 9,019,950 B2
(45) Date of Patent: Apr. 28, 2015

(54) DATA PROCESSING SYSTEM HAVING DISTRIBUTED PROCESSING MEANS FOR USING INTRINSIC LATENCIES OF THE SYSTEM

(75) Inventor: Albert Martinez, Bouc Bel Air (FR)

(73) Assignee: STMicroelectronics Rousset SAS, Rousset (FR)

( * ) Notice: Subject to any disclaimer, the term of this patent is extended or adjusted under 35 U.S.C. 154(b) by 273 days.

(21) Appl. No.: 12/471,086

(22) Filed: May 22, 2009

(65) Prior Publication Data
US 2010/0040045 A1 Feb. 18, 2010

(30) Foreign Application Priority Data

Aug. 14, 2008 (FR) ...................................... 08 04593

(51) Int. Cl.
| | | |
|---|---|---|
| H04L 12/28 | (2006.01) | |
| H04J 1/16 | (2006.01) | |
| G08C 15/00 | (2006.01) | |
| G06F 13/40 | (2006.01) | |

(52) U.S. Cl.
CPC .................................. G06F 13/4022 (2013.01)

(58) Field of Classification Search
USPC .................. 370/417–477, 503–542, 238–352, 370/389–395; 709/203–208, 212–250; 710/22–33, 113–116, 68–107; 714/757–801; 719/314–320
See application file for complete search history.

(56) References Cited

U.S. PATENT DOCUMENTS

| | | | | |
|---|---|---|---|---|
| 5,737,638 | A * | 4/1998 | Byrn et al. ...................... | 710/68 |
| 5,991,824 | A * | 11/1999 | Strand et al. ..................... | 710/1 |
| 6,701,479 | B2 * | 3/2004 | Keller ............................. | 714/757 |
| 6,763,401 | B2 * | 7/2004 | Hayashi et al. .................. | 710/22 |
| 7,092,410 | B2 * | 8/2006 | Bordonaro et al. ........... | 370/516 |
| 7,185,138 | B1 * | 2/2007 | Galicki .......................... | 710/316 |
| 7,526,526 | B2 * | 4/2009 | Clemens et al. ............. | 709/208 |
| 7,584,298 | B2 * | 9/2009 | Klinker et al. ................ | 709/238 |
| 7,668,966 | B2 * | 2/2010 | Klinker et al. ................ | 709/232 |
| 7,769,936 | B2 * | 8/2010 | Mace ............................ | 710/113 |
| 7,769,965 | B2 * | 8/2010 | Couvert et al. ............... | 711/154 |
| 7,792,083 | B2 * | 9/2010 | Bordonaro et al. ........... | 370/334 |
| 7,907,520 | B2 * | 3/2011 | Kotrla et al. .................. | 370/229 |
| 7,907,625 | B1 * | 3/2011 | MacAdam .................... | 370/412 |
| 7,913,010 | B2 * | 3/2011 | Hoover et al. ................ | 710/107 |
| 7,991,978 | B2 * | 8/2011 | Kuesel et al. .................. | 712/11 |
| 8,014,273 | B1 * | 9/2011 | Barrett et al. ................. | 370/210 |
| 8,121,036 | B2 * | 2/2012 | Liu et al. ....................... | 370/235 |
| 8,218,445 | B2 * | 7/2012 | Katz et al. .................... | 370/238 |
| 8,438,578 | B2 * | 5/2013 | Hoover et al. ................ | 719/313 |
| 8,442,030 | B2 * | 5/2013 | Dennison ...................... | 370/351 |

(Continued)

*Primary Examiner* — Man Phan
(74) *Attorney, Agent, or Firm* — Seed IP Law Group PLLC

(57) ABSTRACT

The present disclosure relates to a method for routing data between a sending unit and a receiving unit linked by a network in a processing system comprising several units, the method comprising steps of routing data in the network between the sending unit and the receiving unit, and of applying a process to the routed data, the process comprising several steps which are applied to the data by different units in the network receiving the data, to use latency times in data routing.

37 Claims, 3 Drawing Sheets

(56) References Cited

U.S. PATENT DOCUMENTS

| | | | |
|---|---|---|---|
| 8,490,110 B2* | 7/2013 | Hoover et al. | 719/312 |
| 2007/0288691 A1 | 12/2007 | Couvert et al. | |
| 2008/0019382 A1* | 1/2008 | Wainwright et al. | 370/401 |
| 2008/0069023 A1* | 3/2008 | Rubin | 370/312 |
| 2008/0168510 A1* | 7/2008 | Small et al. | 725/100 |
| 2008/0279204 A1* | 11/2008 | Pratt et al. | 370/406 |
| 2008/0285971 A1* | 11/2008 | Liboiron-Ladouceur et al. | 398/45 |
| 2009/0161659 A1* | 6/2009 | Lee et al. | 370/352 |
| 2009/0282419 A1* | 11/2009 | Mejdrich et al. | 719/314 |
| 2010/0165881 A1* | 7/2010 | Hof et al. | 370/254 |
| 2012/0014319 A1* | 1/2012 | Sun et al. | 370/328 |

* cited by examiner

DATA PROCESSING SYSTEM HAVING DISTRIBUTED PROCESSING MEANS FOR USING INTRINSIC LATENCIES OF THE SYSTEM

BACKGROUND

1. Technical Field

The present disclosure relates to data processing systems comprising several elements communicating between themselves through an interconnected network. The present disclosure relates in particular to SoC (System-on-Chip) systems, integrated into a semiconductor chip.

2. Description of the Related Art

Data transmission in a network linking several elements of a processing system, suffers delays due to intrinsic latencies related to the architecture of the network. The sources of such latency are generally found in the routing arrays, the possible format conversion processes applied to the data, and the time required for data to transit in buffer or temporary storage memories. The data sent may also have to undergo specific processes before being received by a receiving element.

FIG. 1 schematically represents a processing system comprising a transmission network TN, initiation elements INIT1, INIT2 capable of initiating a communication in the network, receiving elements TGT1, TGT2 capable of receiving messages from the network, and possibly specific processes PRCA, PRCB likely to be applied to the messages before they are sent to the receiving elements. The global latency for message transmission is equal to the latency Ln of the network increased by the latency Lpi introduced by the process PRCA, PRCB applied to the message.

In a System-on-Chip (SoC), the interconnected network TN is generally a bus, for example of STBus or AMBA type, etc. The initiation elements INIT1, INIT2 are elements which can be master on the bus and initiate transactions towards the receivers. The initiation elements are for example processing units (CPU), and DMA (Direct Memory Access) control units. The receiving elements TGT1, TGT2 are slave elements which can only respond to requests sent by the initiation elements. The receiving elements are for example an external memory of the system and an acceleration unit.

Furthermore, it is often necessary to protect the external memory of a system against attacks aiming to read or change its content. To counter this type of attack, one well-known method involves applying a ciphering function to the data before writing it in the external memory, and a reverse function to the data read in the memory.

Thus, FIG. 2 schematically represents a System-on-Chip PS connected to an external memory EMEM. The system PS comprises initiation units such as a processing unit CPU and a DMA control unit DCU, a bus infrastructure BIS, and a ciphering/deciphering interface unit EDU enabling the data stored in the external memory EMEM to be secured. The bus infrastructure BIS introduces a latency Ln into the sending of requests for accessing the memory EMEM sent by the initiation units CPU. The unit EDU introduces additional latency Lp in the processing of these requests. It shall be noted that the initiation units can also introduce latencies corresponding for example to transit times in a cache memory or a buffer memory. The time needed to access the external memory which can be quite long is also a latency Lm which increases the duration of the process of ciphering or deciphering the data written or read in the memory EMEM.

BRIEF SUMMARY

It is desirable to reduce the global latency in a data processing system comprising several units interconnected by a data transmission network. For this purpose, one embodiment of the present disclosure takes advantage of the different latencies to perform repetitive and systematic processes on the data sent.

One embodiment provides a method for routing data between a sending unit and a receiving unit linked by a network in a processing system comprising several units, the method comprising steps of routing data in the network between the sending unit and the receiving unit, and applying a process to the routed data. According to one embodiment, the process comprises several steps which are applied to the data by different units of the network receiving the data, to use latency times in data routing.

According to one embodiment, a piece of information which can be used to determine the progress of the process is sent in association with the data sent in the network.

According to one embodiment, the process applied to the data sent is a ciphering or deciphering process depending on the identity of the unit sending or receiving the data sent, or a data formatting process.

According to one embodiment, the process applied to the data comprises several iterations.

According to one embodiment, the data is sent in the network in association with a piece of information which can be used to determine the number of iterations executed or still to be executed on the data sent.

According to one embodiment, the data is sent in the network in frames containing the information used to determine the number of iterations still to be executed on the data sent.

According to one embodiment, the number of iterations executed by each unit in the system is fixed.

According to one embodiment, the number of iterations executed by a unit in the system is adapted to a time for data to transit in the unit.

According to one embodiment, there is also provided a system comprising several networked units, the system being configured for routing data between a sending unit and a receiving unit and for applying a process to the data. According to one embodiment, the process comprises several steps, at least some of the units in the network being configured to apply certain steps in the process to the data they receive, to use latency times in data routing.

According to one embodiment, the system is configured for sending in association with the data sent in the network, a piece of information which can be used to determine the progress of the process.

According to one embodiment, the process applied to the data sent is a ciphering or deciphering process depending on the identity of the unit sending or receiving the data sent, or a data formatting process.

According to one embodiment, the process applied to the data comprises several iterations.

According to one embodiment, the data is sent into the network in association with a piece of information which can be used to determine the number of iterations executed or still to be executed on the data sent.

According to one embodiment, the data is sent in the network in frames containing the information used to determine the number of iterations still to be executed on the data sent.

According to one embodiment, the number of iterations executed by each unit in the system is fixed.

According to one embodiment, the number of iterations executed by a unit in the system is adapted to a time for data to transit in the unit.

According to one embodiment, the network is a local bus interconnecting the units in the system.

According to one embodiment, the system comprises several sub-systems networked through routers forming nodes of a network, each sub-system comprising a network interface unit connected to one of the routers, the interface units and the routers each comprising a shared processing unit for executing one or more iterations of a process to be applied to the data sent by the network.

According to one embodiment, the system is produced on a semiconductor chip.

BRIEF DESCRIPTION OF THE SEVERAL VIEWS OF THE DRAWINGS

Examples of embodiments of the present disclosure will be described below in relation with, but not limited to, the following figures.

DETAILED DESCRIPTION

Figure 1:
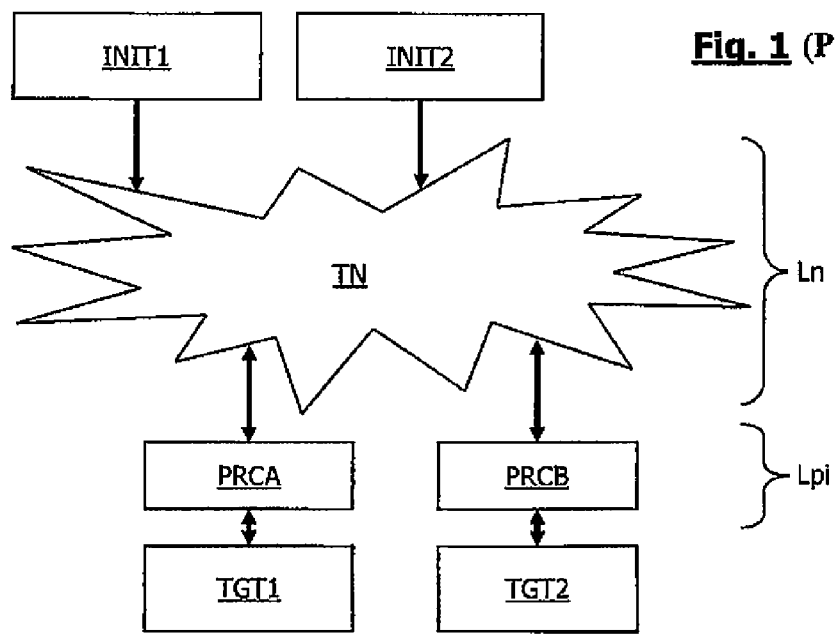
FIG. 1 described previously schematically represents a processing system.
Figure 2:
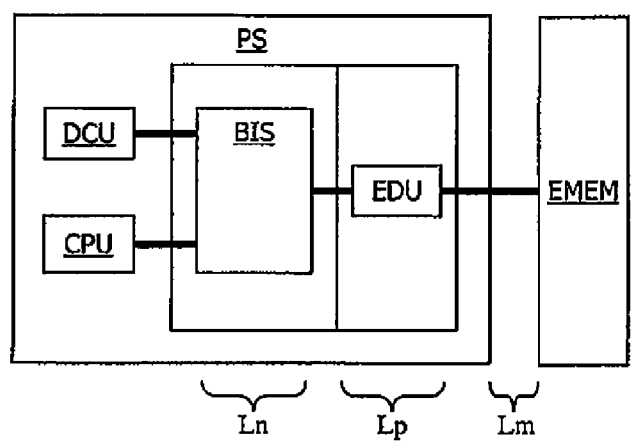
FIG. 2 described previously schematically represents a System on chip.
Figure 3:
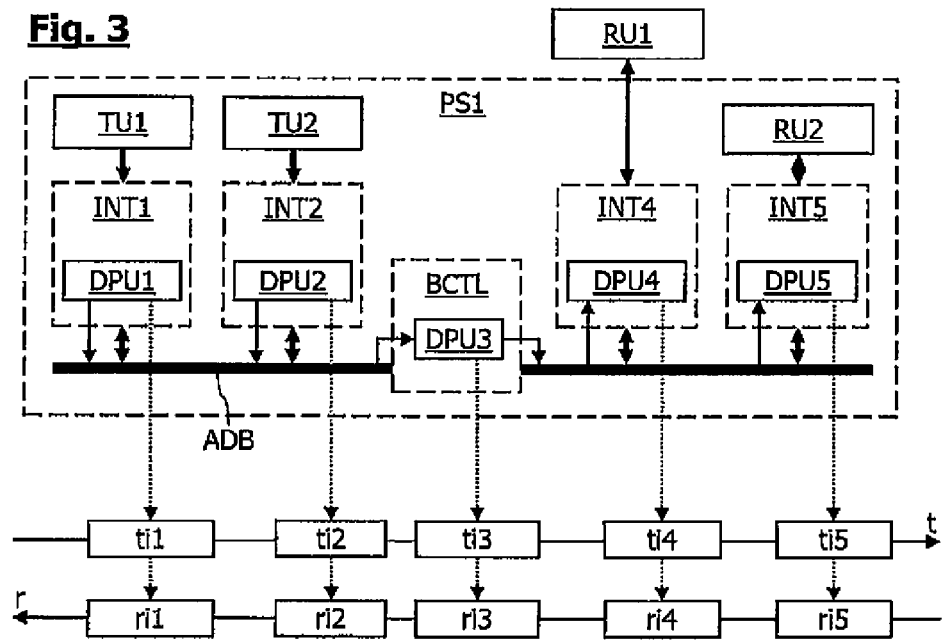
FIG. 3 schematically represents a processing system according to one embodiment, FIG. 4 schematically represents a processing system according to another embodiment, FIG. 5 schematically represents a processing system according to another embodiment.

FIG. 3 represents a processing system PS1 comprising initiation units TU1, TU2 capable of sending requests for accessing data and receiving units RU1, RU2 receiving requests for accessing data. The units TU1, TU2, RU1 and RU2 are connected through interface units INT1, INT2, INT4, INT5 to a bus ADB controlled by a bus control unit BCTL. The receiving units RU1, RU2 can be external or internal to the system PS1. The bus ADB sends data between the initiation units TU1, TU2 and the receiving units RU1, RU2. Before reaching the units RU1, RU2, the data undergoes a process, such as a conversion or ciphering process, for example to be protected if it is sent to the external environment of the processing system PS1. Conversely, before reaching the initiation units TU1, TU2, the data from the units RU1, RU2 undergoes a process enabling it to be usable by the units TU1, TU2. Thus, if the data from the units RU1, RU2 has previously undergone a conversion or ciphering process, it undergoes a reverse conversion process or a deciphering process to be usable by the units TU1, TU2. It shall be noted that the interface units INT1, INT2, INT4, INT5 may indifferently be part of or be outside the units TU1, TU2, RU1 and RU2 as represented in FIG. 3.

The initiation units TU1, TU2 can be processing units, or DMA control units. The receiving units RU1, RU2 can be interface units with external memories, input/output ports of the system or acceleration units. The interface unit INT1, INT2 of a processing unit TU1, TU2 can be a cache memory control unit.

Data transfers between the initiation units and the receiving units introduce latencies, particularly due to operations executed by the interface units INT1, INT2, INT4, INT5 and by the unit BCTL to route the data.

According to one embodiment, the process to be applied to the data sent by the bus ADB comprises several sequential steps which are distributed in distributed processing units DPU1-DPU5 provided in the interface units INT1, INT2, INT4, INT5, and possibly in the bus control unit BCTL. The execution time of the processing steps performed by each of the units DPU1-DPU5 can be less than or equal to the latency time caused by the transfer operations, which appears in the interface unit or the control unit BCTL, where the distributed processing unit is located.

If the data transfer paths in the system PS1 are considered, the data is transferred into the system of an initiation unit TU1, TU2 to a receiving unit RU1, RU2, or conversely, by passing through the bus control unit BCTL. The result is that the process to be applied to the data can be shared between the units DPU1 or DPU2, DPU3 and DPU4 or DPU5. Thus, upon a data transfer from an initiation unit TU1, TU2 to a receiving unit RU1, RU2, the unit DPU1 or DPU2 performs one or more of the first steps of the process to be applied to the data, the unit DPU3 performs one or more intermediate steps, and the unit DPU4 or DPU5 performs one or more of the last steps of the process. Conversely, upon a data transfer from a receiving unit RU1, RU2 to an initiation unit TU1, TU2, the unit DPU4 or DPU5 performs one or more of the first steps of the process to be applied to the data, the unit DPU3 performs one or more intermediate steps, and the unit DPU1 or DPU2 performs one or more of the last steps of the process.

According to one embodiment, the process to be applied to the data is an iterative process, i.e., comprising the execution a certain number of times, of a same processing step referred to as "iteration" applied to the data proceeding from a previous iteration. FIG. 3 represents on oriented axes t and r symbolizing the data transfer direction, upon sending (from the initiation units to the receiving units), and upon receiving (from the receiving units to the initiation units), the number of iterations $ti1$-$ti5$ and $ri1$-$ri5$ respectively executed by each of the units DPU1-DPU5 upon sending and receiving. The numbers of iterations follow the following relations:

$$(ti1 \text{ or } ti2) + ti3 + (ti4 \text{ or } ti5) = nti \quad (1)$$

$$(ri1 \text{ or } ri2) + ri3 + (ri4 \text{ or } ri5) = nri \quad (2)$$

$nti$ and $nri$ being the total number of iterations of the process to be applied to the data, respectively upon sending and receiving.

According to one embodiment, $ti1$ is equal to $ti2$, $ti4$ is equal to $ti5$, $ri1$ is equal to $ri2$ and $ri4$ is equal to $ri5$.

Alternatively, the numbers of iterations $ti1$ and $ti2$ are different for example to be adapted to the duration of the processes performed by the interface units INT1 and INT2. The numbers of iterations $ti4$ and $ti5$ are then adapted to the number of iterations still to be performed to complete the process to be applied to the data transferred to one or other of the receiving units RU1, RU2. For this purpose, each unit DPU1-DPU3 updates and sends with the processed data the number of iterations already performed or still to be performed. Alternatively, an identifier of the sending unit is sent in association with the processed data, such that the unit DPU4 or DPU5 which must complete the process may determine the number of iterations still to be performed.

The numbers of iterations $ri4$ and $ri5$ can also be different for example to be adapted to the duration of the processes performed by the interface units INT4 and INT5. The numbers of iterations $ri1$ and $ri2$ are then adapted to the number of iterations still to be performed to complete the process to be applied to the data transferred to one or other of the initiation units TU1, TU2. For this purpose, each unit DPU3-DPU5 updates and sends with the processed data the number of iterations already performed or still to be performed. Alternatively, each unit DPU3-DPU5 sends with the processed data an identifier of the sending unit INT4 or INT5, such that the unit DPU1 or DPU2 that completes the process can determine the number of iterations still to be performed.

According to one embodiment, the initiation unit TU1, TU2 or the corresponding interface unit INT1, INT2 tells the unit DPU4, DPU5 of the receiving unit RU1, RU2 the number of iterations ri4, ri5 to be performed or its identifier such that the unit DPU4, DPU5 or the unit INT4, INT5 can determine the number of iterations ri4, ri5 to be performed.

Figure 4:
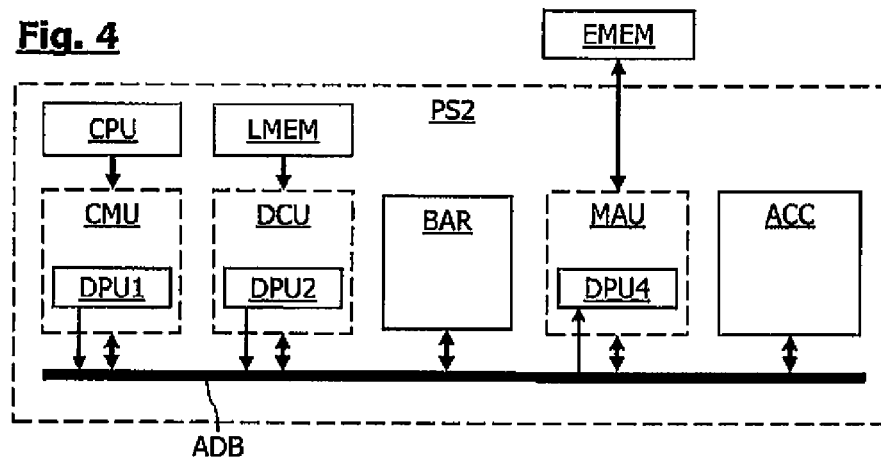

FIG. 4 represents an example of a processing system PS2 comprising a processing unit CPU, a DMA control unit DCU, an external memory interface unit MAU, an acceleration unit ACC and a bus arbitration unit BAR controlling the access to a bus ADB interconnecting the units CPU, DCU, ACC and MAU. The unit CPU is linked to the bus ADB through a cache memory unit CMU. The function of the unit MAU is to give the system access to an external memory EMEM, the content of the memory being cipher protected. The function of the unit DCU is to ensure DMA transfers between an internal unit and the external memory EMEM. The units capable of controlling a data writing or reading operation in the memory EMEM are the processing units CPU or the cache memory unit CMU and the control unit DCU. The ciphering/deciphering functions applied to the data stored in the memory EMEM are for example based on an AES-type algorithm (Advanced Encryption System). This algorithm classically comprises 10 iterations to cipher and decipher 128 bits of data, with the first iteration possibly being slightly different from the others.

To use the latency time appearing in the system, the iterations of the ciphering/deciphering functions are distributed in the system. Thus, the units CMU, DCU, and MAU each comprise a ciphering and deciphering unit DPU1, DPU2 and DPU4. The number of iterations performed by each of the units DPU1, DPU2, DPU4 is adapted to the latency time introduced by the unit of which it is part, while complying with the requirement that the total number of iterations performed during a data transfer corresponds to the number of iterations to be performed. The number of iterations performed by the unit DPU4 in the unit for accessing the memory MAU thus corresponds to the number of iterations still to be performed upon a data writing operation in the memory EMEM, given the number of iterations managed by one or other of the units DPU1, DPU2. Similarly, upon a data reading operation in the memory EMEM, the number of iterations performed by the unit DPU1 in the unit CMU or DPU2 in the unit DCU corresponds to the number of iterations still to be performed.

For example, to perform a DMA transfer from the external memory EMEM to the acceleration unit ACC, the unit CPU programs the unit DCU to read a set of, for example, 1,024 words of 32 bits in the memory EMEM and to transfer this set to the unit ACC. The unit DCU transfers this set in blocks of 8 words, each block being transferred temporarily into a local memory LMEM connected to the unit DCU, before being transferred to the unit ACC. The time for accessing the memory EMEM is of L1 clock cycles for the first word in the memory, then 1 cycle for each of the next seven words. The deciphering of the data read in a memory requires 10 iterations of 1 clock cycle for 128 bits, i.e., 2×10 cycles for 256 bits. Each block of 8 words transits for 9 clock cycles in the local memory LMEM. If the entire deciphering process is performed by the unit DPU4, the time necessary L to transfer a block of 8 words of 32 bits (256 bits) from the memory EMEM to the unit ACC is as follows:

$$L=L1+7+10+10+9$$

If a part of each deciphering process, for example 4 iterations, is performed by the unit DPU2, so as to use a part of the transit time of 9 cycles in the memory LMEM, the transfer time L is reduced to:

$$L=L+7+6+6+9, \text{ i.e., a decrease by 8 cycles.}$$

To perform a DMA transfer from the acceleration unit ACC to the external memory EMEM, the unit CPU programs the unit DCU to read a set of, for example, 1,024 words of 32 bits in the unit ACC, and to transfer it into the memory EMEM. The unit DCU transfers the set in blocks of 8 words, each block being transferred temporarily into the local memory LMEM before being transferred to the unit MAU. The time for write accessing the memory EMEM is of L2 clock cycles for the first word in the memory, then 1 cycle for each of the next seven words. The deciphering of the data read in a memory requires 10 iterations of 1 clock cycle for 128 bits, i.e., 2×10 cycles for 256 bits, and each block of 8 words transits for 9 clock cycles in the local memory LMEM. If the entire ciphering process is performed by the unit DPU4, the time L to transfer a block of 8 words of 32 bits from the unit ACC to the memory EMEM is as follows:

$$L=9+10+10+L2+7$$

If a part of each ciphering process, for example 4 iterations, is performed by the unit DPU2, so as to use the transit time of 9 cycles in the memory LMEM, the transfer time L is reduced to:

$$L=9+6+6+L2+7, \text{ i.e., a decrease by 8 cycles.}$$

If the size of the blocks transferred is variable, the number of iterations executed by the unit DPU2 when reading or writing the memory EMEM can be adapted to the latency time of the unit DCU. Thus, if the size of the blocks transferred is of 4 words of 32 bits, the latency time of the unit DCU changes to 5 cycles. The unit DPU2 can then execute only one iteration of the ciphering or deciphering process, the nine other iterations then being performed by the unit DPU4. If the size of the blocks transferred is of 16 words of 32 bits, the latency time of the unit DCU changes to 17 cycles. All of the ciphering and deciphering processes can thus be performed by the unit DPU2.

The initiation units CPU (or CMU) and DCU are configured for adapting the number of iterations executed by their distributed processing unit DPU1, DPU2 depending on the latency of the processing they activate. The requests to the external memory EMEM sent to the unit MAU indicate the number of iterations to be performed by the unit DPU4. Thus, upon writing in the memory EMEM, the data to be written are sent by the bus ADB in association with the number of ciphering iterations still to be performed by the unit DPU4. Upon reading the memory EMEM, the reading request can be associated with the number of iterations of the deciphering process to be performed by the unit DPU4. The unit DPU4 can also be configured so as to be able to observe the requests for accessing the memory, containing the sender of the request and a type of request, and to determine the number of iterations to be executed depending on this information.

In a simplified alternative, the number of iterations executed by each unit DPU1, DPU2, DPU4 is fixed, irrespective of the request and the data transfer direction between the memory EMEM and the system PS2. In this case, it is not necessary to send, with the data, any information that can be used to determine the progress of the process or the number of iterations to be executed by the processing unit DPU1, DPU2, DPU4 which receives the data.

Figure 5:
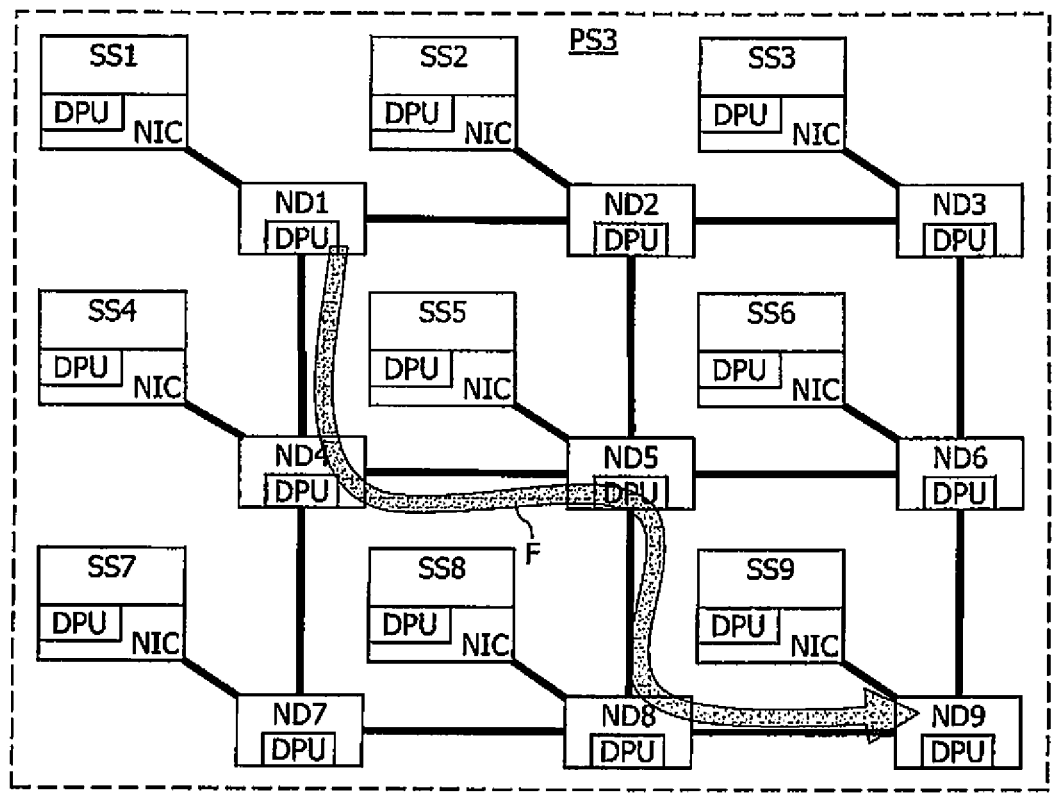

FIG. 5 represents a system PS3 having an NoC (Network on Chip) integrated network architecture. The system PS3 comprises several sub-systems SS1-SS9 networked through routers ND1-ND9 forming nodes of the network. Each sub-system SS1-SS9 comprises a network interface unit NIC connected to one of the routers ND1-ND9.

To use the intrinsic latency times of the network, the interface units NIC and the routers ND1-ND9 each comprise a shared processing unit DPU. Each router ND1-ND9 may comprise one or more input and output ports to be connected to one or more other routers. Each sub-system SS1-SS9 may comprise one or more processors, one or more internal memories, input/output controllers and a local bus interconnecting the different components of the sub-system. Each sub-system SS1-SS9 may also have a specific clock which can be fully asynchronous with the clocks of the other sub-systems. Thus, each sub-system SS1-SS9 can have the architecture represented in FIG. 3 or 4, with the network interface unit NIC connected to the local bus ADB.

To manage the asynchronism of the sub-systems SS1-SS9, the routers ND1-ND9 and the network interface units NIC of the sub-systems comprise buffer memories for example of FIFO (First-In First-Out) type temporarily storing data to be sent by the network. This results in latency times which can be used by the units DPU to perform steps of a process to be applied to the data to be sent. The data is then sent in association with a piece of information that can be used to determine the progress of the process. Thus, if the data is sent between the nodes of the network in frames, a field of each frame can specify a progress status of the process, such as a number of iterations.

FIG. 5 represents by an arrow F a data transmission path in the system PS3, from the sub-system SS1 to the sub-system SS9, and passing through the routers ND1, ND4, ND5, ND8 and ND9. The process to be applied to the data can therefore be performed successively by the processing units DPU of the sub-system SS1, then of the routers ND1, ND4, ND5, ND8 and ND9, and finally of the sub-system SS9.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
routing data in a network between a sending unit and a receiving unit, the sending unit and the receiving unit being linked by the network in a processing system comprising a plurality of other units that receive the data as the data is routed between the sending and the receiving units; and
applying a particular multi-step process to the data, as the data is routed between the sending unit and the receiving unit, by:
for each of the plurality of other units that receive the data as the data is routed between the sending unit and the receiving unit, performing one or more steps of the particular multi-step process in the other unit based on latency times introduced by the other unit as the data is routed.

2. The method according to claim 1, wherein the routing includes sending a piece of information in association with the data, the piece of information used to determine progress of the particular process applied to the data.

3. The method according to claim 1, wherein the particular multi-step process applied to the data is one of a ciphering or deciphering process, depending on an identity of the sending unit or the receiving unit, and a data formatting process.

4. The method according to claim 1, wherein the particular multi-step process applied to the data comprises several iterations, wherein each of the plurality of other units that receive the data as the data is routed executes a number of the several iterations on the data.

5. The method according to claim 4, wherein the routing further includes sending in association with the data a piece of information used to determine one of a number of the several iterations that have been executed on the data and a number of the several iterations that remain to be executed on the data.

6. The method according to claim 5, wherein the routing further includes routing the data in frames containing the piece of information used to determine the number of the several iterations that remain to be executed.

7. The method according to claim 4, wherein the number of the several iterations that each of the plurality of other units executes is a fixed number.

8. The method according to claim 4, wherein the number of the several iterations that each of plurality of other units executes is adapted to a time for data to transit in the other unit.

9. A system, comprising:
a transmission network; and
a plurality of distributed units linked via the transmission network,
wherein the system is configured to route data between a sending unit and a receiving unit via at least some of the plurality of distributed units and to apply a multi-step process to the data as the data is routed between the sending unit and the receiving unit, and wherein each of the at least some of the plurality of distributed units is configured to perform at least one step of the multi-step process on the data received by the distributed unit as the data is routed between the sending and the receiving units based at least in part on latency time introduced by the distributed unit.

10. The system according to claim 9, further configured to send in association with the data a piece of information used to determine progress of the multi-step process that is applied to the data as the data is routed between the sending unit and the receiving unit.

11. The system according to claim 9, wherein the multi-step process is at least one of a ciphering or deciphering process depending on an identity of the sending or receiving units, and a data formatting process.

12. The system according to claim 9, wherein the multi-step process comprises several iterations, wherein each of the at least some of the plurality of distributed units executes a number of the several iterations on the data.

13. The system according to claim 12, further configured to route the data with an associated piece of information used to determine a number of the several iterations executed or still to be executed on the data.

14. The system according to claim 13, wherein the system is further configured, when routing the data between the sending unit and the receiving unit, to route the data in frames containing the piece of information.

15. The system according to claim 12, wherein the number of the several iterations executed by each of the at least some of the plurality of distributed units is a fixed number.

16. The system according to claim 12, wherein the number of the several iterations executed by each of the at least some of the plurality of distributed units is based on a time for data to transit in the distributed unit.

17. The system according to claim 9, wherein the transmission network is a local bus interconnecting the plurality of distributed units in the system.

18. The system according to claim 9 further comprising several sub-systems networked through routers forming nodes of a network, each sub-system comprising a network interface unit connected to one of the routers, the network interface units and the routers each comprising a shared processing unit for executing one or more iterations of the particular process.

19. The system according to claim 9, wherein the system is produced on a semiconductor chip.

20. A data processing system, comprising:
a transmission network;
a plurality of distributed units interconnected via the transmission network; and
means for routing data between a sending unit and a receiving unit via at least some of the plurality of distributed units and applying a multi-step process to the data as the data is routed between the sending unit and the receiving unit, wherein each of the at least some of the plurality of distributed units has means for executing at least some steps of the multi-step process on the data that the distributed unit receives as the data is routed between the sending unit and the receiving unit, and means for determining steps of the multi-step process to be performed by the means for executing based at least in part on latency times introduced by routing the data between the sending and receiving units.

21. The data processing system according to claim 20, wherein the means for routing data is further for, when routing the data between the sending unit and the receiving unit, sending in association with the data, a piece of information used to determine progress of the multi-step process being applied to the data as the data is routed.

22. The data processing system according to claim 20, wherein the multi-step process is at least one of a ciphering or deciphering process depending on an identity of one of the sending unit and the receiving unit.

23. The data processing system according to claim 20 wherein the multi-step process is a data formatting process.

24. The data processing system according to claim 20, wherein the multi-step process comprises several iterations, the means for executing of each of the at least some of the plurality of distributed units having means for executing a number of the several iterations on the data.

25. The data processing system according to claim 24, wherein the number of the several iterations executed by each of the at least some of the plurality of distributed units is based on a time for data to transit in the distributed unit.

26. The data processing system according to claim 20 further comprising several sub-systems networked through routers forming nodes of a network, each sub-system comprising a network interface unit connected to one of the routers, the network interface units and the routers each comprising a shared processing unit for executing one or more iterations of the multi-step process.

27. The data processing system of claim 20 wherein the means for determining steps of the multi-step process is configured to determine a number of steps to be performed by one of the distributed units based on a latency time of the one of the distributed units.

28. The method of claim 1 wherein the particular multi-step process is a conversion process and applying the particular multi-step process comprises applying one or more steps of a conversion process to the data in each of the plurality of other units that receive the data as the data is routed between the sending unit and the receiving unit.

29. The method of claim 1 wherein the performing one or more steps comprises determining a number of steps of the particular multi-step process to be performed in the other unit based on latency times introduced by the other unit.

30. The system of claim 9 wherein a number of the at least one of the plural steps to be performed by a distributed unit of the at least some of the plurality of distributed units is based at least in part on a latency time of the distributed unit.

31. The system of claim 9 wherein each of the plural steps comprises applying one or more steps of a conversion process to the data.

32. A device, comprising:
a transmission network; and
a plurality of distributed units linked via the transmission network and configured to:
determine a set of distributed units of the plurality of distributed units through which to route data;
determine, for each of the units of the determined set, a number of steps of a particular process to apply to the data as the data is routed through the distributed unit based on a latency time of the distributed unit; and
apply the particular process to the data as the data is routed through the determined set of distributed units.

33. The device of claim 32 wherein the particular process is a multi-step conversion process and each step of the particular process comprises applying one or more steps of the multi-step conversion process to the data.

34. The device of claim 32 wherein the determined number of steps for each distributed unit of the determined set of distributed units is greater than or equal to one.

35. The device of claim 32 wherein the routing data includes sending in association with the data a piece of information used to determine progress of the particular process that is applied to the data as the data is routed between a sending unit and a receiving unit.

36. The device of claim 32 wherein the particular process comprises several iterations.

37. The device of claim 36 wherein each distributed unit of the set of distributed units is configured to perform at least one iteration of the particular process.

* * * * *

UNITED STATES PATENT AND TRADEMARK OFFICE
CERTIFICATE OF CORRECTION

| | | |
|---|---|---|
| PATENT NO. | : 9,019,950 B2 | Page 1 of 1 |
| APPLICATION NO. | : 12/471086 | |
| DATED | : April 28, 2015 | |
| INVENTOR(S) | : Martinez | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 616 days.

Signed and Sealed this
Twenty-seventh Day of October, 2015

Michelle K. Lee
*Director of the United States Patent and Trademark Office*